Dec. 8, 1925.　　　　　　　　　　　　　　　　　　　　1,565,177
D. MacKENZIE
METHOD AND APPARATUS FOR COMPARING SOUNDS
Filed April 25, 1922
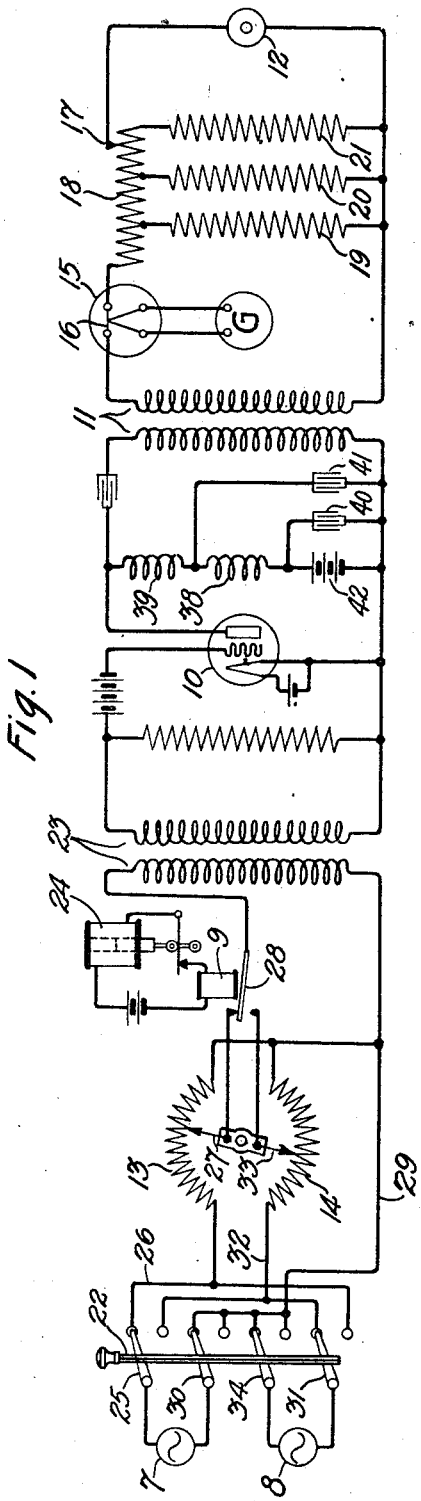
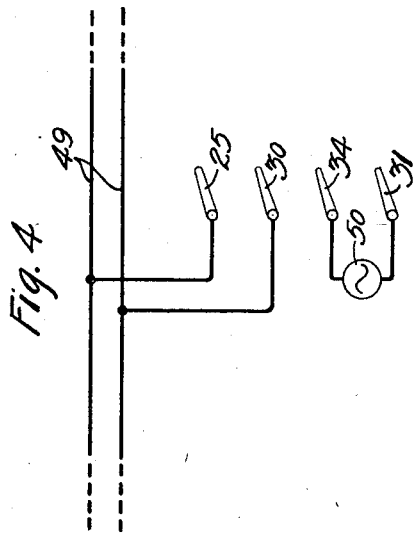
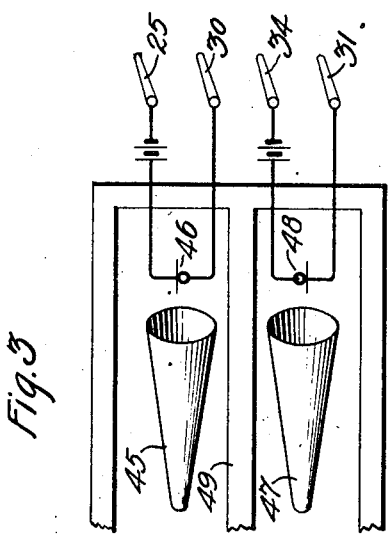
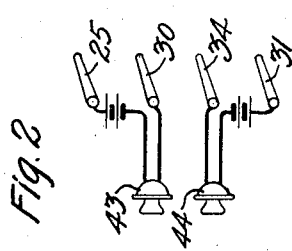
Inventor:
Donald MacKenzie
by Joel R. Palmer Att'y.

Patented Dec. 8, 1925.

1,565,177

UNITED STATES PATENT OFFICE.

DONALD MacKENZIE, OF NEW YORK, N. Y., ASSIGNOR TO WESTERN ELECTRIC COMPANY, INCORPORATED, OF NEW YORK, N. Y., A CORPORATION OF NEW YORK.

METHOD AND APPARATUS FOR COMPARING SOUNDS.

Application filed April 25, 1922. Serial No. 556,486.

*To all whom it may concern:*

Be it known that I, DONALD MACKENZIE, a citizen of the United States, residing at New York, in the county of Bronx, State of New York, have invented certain new and useful Improvements in Methods and Apparatus for Comparing Sounds, of which the following is a full, clear, concise, and exact description.

This invention relates to means and methods for comparing acoustic or electric waves.

An object of this invention is to provide a simple and accurate arrangement for comparing a plurality of sources of electric waves with respect to each other or to a standard of given intensity.

Another object is to compare, with respect to loudness, tones of different frequencies.

Another object is to provide methods and means for accurately determining the intensity of tones which appear to be of equal loudness to the human ear.

Another object is to provide a method and apparatus for measuring cross talk or interference disturbances in signaling systems with respect to a tone of given intensity.

Another object is to provide means and methods for impressing sources of different characteristics upon the human ear in such a manner as to enable an accurate comparison of the sounds by the ear, whereby the detection and investigation of sounds, the resonant properties of bodies and other reflecting properties may be more accurately investigated than has heretofore been possible.

A satisfactory way to compare two mechanical or electrical sources of sound waves is to measure their characteristics when they appear to be of equal loudness to the ear.

This invention provides means for impressing in rapid succession on the ear two sounds of different characteristics and for varying the characteristics of each, until they appear to be of equal loudness to the ear. The relative values of the characteristics of the waves may then be measured. It has been found that, in any measurements to be made by the ear, rapidity of succession of the impressions to be compared is essential. If the ear is required to listen to one tone for an appreciable length of time before the second tone is impressed on the ear, the aural mechanism which appreciates loudness, is fatigued as the sound continues and a flagging of the attention of the observer also ensues. When the two tones are of different frequencies, it seems that different mechanisms respond to the two frequencies, and the comparison would then be made between the decayed response to the first frequency and a fresh response to the second frequency. The inaccurate measurements resulting therefrom may be overcome by having the two frequencies alternating in the ear at a rapid rate, the intensity of one being maintained constant, while the other is varied from faint to loud in comparison. The strong tone is heard plainly interrupted, accompanied by the weaker tone whose interruptions are not clearly distinguished. If now, the weaker tone is progressively strengthened its interruptions begin to claim the observer's attention and with further increase in intensity overshadow the constant tone, just as they were previously overshadowed when faint. A little practice enables the observer to determine a point at which the ear recognizes the two tones as equally interrupted, and such a point may be identified with a loudness balance. Comparisons of this kind avoid differences due to the shortness of the persistence of addition and ear fatigue.

If the two sources to be compared are sources of electric waves, the sources are alternately and in rapid succession connected to a suitable device for translating electric waves into sound waves, such as a telephone receiver or thermophone. The sources are then adjusted until the tones produced by the translating device appear to be of equal loudness. Previously calibrated adjustable means for varying the intensity of the sources will then indicate their relative intensity. If the sources are mechanical sources of sound waves, the sound waves are faithfully reproduced in separate circuits into electric waves which are alternately and in rapid succession impressed on the receiver, and the intensity of the electric currents adjusted until equal loudness is reached. It is preferable to translate the sound waves to be compared first into electric waves for the reason that more satisfactory alternation means for shifting from one source of electric currents to another can be provided, than for shifting from one source of sound waves to another.

Referring to the drawings, Fig. 1 illustrates an apparatus for comparing and adjusting two electric sources of different frequencies until they appear to be of equal loudness to the ear. Fig. 2 illustrates how Fig. 1 may be modified to determine the relative loudness characteristics of two telephone transmitters. Fig. 3 shows how Fig. 1 may be modified to be employed in the comparison of two acoustic waves of different frequencies, and Fig. 4 shows how Fig. 1 may be modified in the determination of the intensity of the disturbing currents in a signaling line.

The apparatus disclosed in Fig. 1, which may be called an alternation phonometer, comprises means for comparing and adjusting two electrical sources of different frequencies until they appear to be of equal loudness to the ear. Sources 7 and 8 are electric sources, which by means of switching contacts controlled by a relay 9, are alternately and in rapid succession impressed upon the input circuit of a vacuum tube amplifier 10. The output circuit of amplifier 10 by a transformer 11 is connected to a device 12, such as a telephone receiver, for translating electric waves into sound waves. Potentiometers 13 and 14 are provided for varying the intensities of the two electric sources 7 and 8, and these potentiometers are separately or simultaneously adjusted by the observer until the two tones of different frequencies emitted by receiver 12 appear to be of equal loudness to the ear of the observer. After this loudness balance has been reached, the actual intensities of the two currents may be measured by any suitable means such as a vacuum thermo-couple 15, which has its heater element 16 in series with the secondary winding of transformer 11 and receiver 12, the outside terminals of the couple being connected to a suitable current measuring instrument such as a galvanometer G.

This loudness balance may be repeated for various tone intensities by moving adjustable contact 17 to various positions upon the attenuator resistance 18, which is connected in series with receiver 12. As described and claimed in the copending application to Wegel, Serial No. 483,533, filed July 9, 1921, series resistance 18 and shunt resistances 19, 20 and 21 may be so constructed that amplifier 10 works into the same impedance load regardless of the position of adjustable contact 17 on resistance 18.

Switching means 22, in the position shown in the drawing, connects potentiometer 13 in circuit source 7, and connects potentiometer 14 in circuit with source 8. In order to serve as a check on the observer, switch 22 may be moved to its other position so that the connections of potentiometers 13 and 14 are reversed, potentiometer 13 now being in circuit with source 8, and potentiometer 14 in circuit with source 7.

The means for alternately and in rapid succession impressing currents from sources 7 and 8 upon the primary winding of input transformer 23 is shown to be a relay 9 which is alternately energized and deenergized by a self interrupting relay 24. Relay 9 when energized serves to connect source 7 to the primary winding of transformer 23 by the following path: source 7, contact 25, lead 26, resistance 13, adjustable contact 27, relay armature 28, primary winding of transformer 23, lead 29, and contact 30. Relay 9 when deenergized serves to connect source 8 to the primary winding of transformer 23 by the following path: source 8, contact 31, lead 32, resistance 14, adjustable contact 33, relay armature 28, primary winding of transformer 23, lead 29, and contact 34. The duration of the impression of each electric source upon the input circuit of amplifier 10 and the interval of silence between successive impressions depend upon the constants of relays 9 and 24. The relays 9 and 24 should be carefully adjusted to secure an equality of duration of the contact of relay armature 28, in both its energized and deenergized positions, and the travel time for armature 28 between its associated stationary contacts should be an imperceptible interval not be greater than .005 seconds, and preferably .002 seconds, since it is desirable to avoid intervals of silence as much as possible without causing an overlapping of the two frequencies. The duration of each sound may be as much as .1 second although the preferred range is from .020 to .080 seconds, depending upon the frequencies to be compared. An interval of .040 seconds has been found suitable for frequencies from 100 to 4000 cycles per second. As described above, this short duration of each sound is essential, since, if the ear is required to listen to one tone for an appreciable length of time before the second tone is impressed on the ear, the aural mechanism which appreciates loudness is fatigued as the sound continues and a flagging of the attention of the observer also ensues. When the two tones are different frequencies, it seems that different mechanisms respond to the two frequencies and the comparison for a long duration for each tone would then be made between the decayed response to the first frequency and a fresh response to the second frequency. By having the two tones impressed for a very short time, the stronger tone is heard plainly interrupted accompanied by the weaker tone whose interruptions are not clearly distinguishable. If now the weaker tone is progressively strengthened, its interruptions begin to claim the observer's attention, and its intensity overshadows the other tone just as it was previously overshadowed. A little practice enables the observer to determine a point at which the ear recognizes the two tones as equally interrupted, and such a point may be identified with a loudness balance. In obtaining this balance, potentiometer contact arms 27 and 33 may be simultaneously moved to produce opposite changes in the strength of the currents from sources 7 and 8; or only one arm may be varied at a time so that the strength of one current is kept constant while the other is varied.

The amplifier 10 may be of any well-known type and may, for example, be of the so-called three-electrode type of vacuum tube amplifier. Amplifier 10 should be so designed and so connected in circuit that faithful amplification is secured of the frequencies from sources 7 and 8. If desired, a Campbell wave filter comprising series inductances 38, 39, and shunt condensers 40 and 41 may be employed to filter out fluctuations from the source of voltage 42 which is connected between the anode and the cathode of the amplifier 10.

In the operation of Fig. 1 as described above, it has been assumed that sources 7 and 8 are sources of different frequencies which are to be compared. It is obvious, however, that the method of comparison may also be employed when the sources 7 and 8 are of the same frequency, or when each source delivers substantially the same band of frequencies.

The electrical sources 7 and 8 of Fig. 1 have been illustrated schematically to represent any desired type of sources of impulses to be compared. For example, in Fig. 2 the two sources are shown to comprise transmitters 43 and 44, both of which may be actuated by a single source of sound waves, such as the human voice speaking simultaneously in the two transmitters. By operating the apparatus of Fig. 1 in the manner above described, a comparison may then be made between transmitters 43 and 44 relative to their loudness characteristic. This may be done briefly by having the relay 9 in Fig. 1 alternately and in rapid succession connect transmitters 43 and 44 to the input current of amplifier 10, an observer listening in by receiver 12 and adjusting potentiometers 13 and 14 until apparaent equal loudness has been reached. The actual output current of each transmitter may then be measured by the galvanometer G, knowing the amplification constant of the amplifying system comprising tube 10.

The sources to be compared by the arrangement of this invention may be either sources of electric waves or of acoustic waves. Fig. 3 shows how the apparatus in Fig. 1 may be modified to be employed in the comparison of two different sound waves to determine their relative intensity. A speaking tube 45 is shown for impressing upon transmitter 46 sound waves from one of the sources, while a speaking tube 47 is employed for impressing sound waves from the second source upon a transmitter 48. Speaking tubes 45 and 47 should preferably be located in two different rooms separated by a sound-proof wall 49. Connections from transmitters 46 and 48 lead to contacts of switch 22, and thereby are impressed alternately and in rapid succession upon amplifier 10. If the transmitters 46 and 48 are carefully adjusted to produce electrical currents strictly proportional to the intensity of the impressed sound waves, it follows that when potentiometers 13 and 14 are adjusted until the observer listening in with receiver 12 appears to hear the two sources with apparently the same degree of loudness, the currents measured by galvanometer G for the two sources will be a measure of the relative intensity of the two sound sources connected with speaking tubes 47 and 45. This method of comparing two sources of acoustic waves of the same frequency or different frequencies to determine their relative loudness by first translating the two sound waves into electric waves, and then translating into sound waves, is preferable to listening to the two original sound waves directly, because it has been found that more satisfactory results are obtained by employing an electrical switching device instead of a mechanical switchnig device for alternately listening to the two sources of different frequencies or different characteristics.

Another application of the apparatus of Fig. 1 is illustrated in the modification shown in Fig. 4, wherein a signaling line 49 is disclosed, and it is desired to determine the intensity of interfering currents produced therein by foreign sources as compared to the intensity from a standard source of current such as a device 50. This comparison may be readily made by the apparatus of Fig. 1, providing as shown in Fig. 4, the source of one device 50 is connected to contact arms 31 and 34 of switch 22, and connections from contacts 25 and 30 be made to the signaling line 49 under test. The observer will then alternately listen to tones produced by the currents in line 49, and tones by currents from source 50, until a loudness balance has been reached. Current measurements taken by galvanometer G will then indicate the interference factor of line 49.

It is to be understood that this invention is not limited to the particular forms described above, but they may be variously modified without departing from the spirit of the invention as defined in the appended claims.

The invention claimed is:

1. The method of comparing electric waves of different characteristics which comprises alternately and in rapid succession in strictly uniform intervals translating said waves into sound waves, and adjusting the relative intensities of the electric waves until the sounds appear to be of equal intensity.

2. The method of comparing electric waves of different characteristics in which a device for translating electric waves into sound waves is employed, which method comprises impressing electric waves of one characteristic upon said device for a period less than .1 of a second, impressing electric waves of a different characteristic on said device for a period less than .1 of a second after a period of silence between said impressions of less than .005 of a second, and adjusting the intensity of the electric waves until a predetermined ratio exists between the loudness of the two tones.

3. The method of comparing sounds of different characteristics which comprises translating said sounds into electric waves, translating alternately and in rapid succession the electric waves corresponding to the different sounds into sound waves again, and adjusting the intensity of the electric waves corresponding to the different sounds until the translated sounds appear to be of equal loudness.

4. Apparatus for comparing waves of different frequency characteristics comprising independent electrical means for generating electric waves corresponding to the waves of different frequency characteristics to be compared, an amplifier having an input circuit and an output circuit, relay means for impressing upon said input circuit currents of the different frequency characteristics alternately and in rapid succession, means associated with the output circuit for translating the amplified currents into sound waves, and means in circuit with said last means for measuring the intensity of said currents.

5. Apparatus for comparing waves of different frequency characteristics comprising a plurality of independent electrical sources for generating electric waves of the frequency characteristics to be compared, a telephone receiver, means for alternately and in rapid succession impressing the electrical waves of different characteristics upon said receiver at a strictly uniform rate, and means for affecting the relative adjustment of the intensity of the electric waves of different characteristics.

6. Apparatus for comparing sound waves of different frequencies comprising independent electrical means for producing electrical currents of intensities proportional to the intensities of the different sound waves, means for translating electric waves into sound waves, means for impressing upon said translating means alternately and in rapid succession electric waves corresponding to the different sounds at a strictly uniform rate and with a duration of each impression of less than .1 of a second, and means for adjusting the intensities of electric waves of different frequencies until the translated sounds appear to be of equal loudness.

In witness whereof, I hereunto subscribe my name this 20th day of April A. D., 1922.

DONALD MacKENZIE.